United States Patent
Boll

(10) Patent No.: US 7,411,701 B2
(45) Date of Patent: Aug. 12, 2008

(54) N-COLORANT GAMUT CONSTRUCTION

(75) Inventor: Harold Boll, Winchester, MA (US)

(73) Assignee: Kodak Graphic Communications Canada Company, British Columbia (CA)

( * ) Notice: Subject to any disclaimer, the term of this patent is extended or adjusted under 35 U.S.C. 154(b) by 859 days.

(21) Appl. No.: 10/830,026

(22) Filed: Apr. 23, 2004

(65) Prior Publication Data

US 2005/0237545 A1 Oct. 27, 2005

(51) Int. Cl.
*H04N 1/60* (2006.01)
*G06K 9/00* (2006.01)

(52) U.S. Cl. .................. 358/1.9; 358/2.1; 358/518; 382/162

(58) Field of Classification Search ............. 358/1.9, 358/2.1, 502, 504, 517, 515, 518, 3.26, 519; 382/162, 163, 164, 165, 167, 253; 345/589, 345/426, 591, 598, 599, 653
See application file for complete search history.

(56) References Cited

U.S. PATENT DOCUMENTS

| | | | | |
|---|---|---|---|---|
| 5,539,540 | A | * | 7/1996 | Spaulding et al. ........... 358/518 |
| 5,563,724 | A | | 10/1996 | Boll et al. |
| 5,591,552 | A | * | 1/1997 | Ciccarelli et al. ........ 430/45.55 |
| 5,652,831 | A | * | 7/1997 | Huang et al. ................. 345/604 |
| 5,748,221 | A | * | 5/1998 | Castelli et al. ............... 347/232 |
| 5,872,898 | A | * | 2/1999 | Mahy .......................... 358/1.9 |
| 6,229,626 | B1 | | 5/2001 | Boll |
| 6,331,899 | B1 | | 12/2001 | Samadani |
| 6,340,975 | B2 | | 1/2002 | Marsden et al. |
| 7,239,422 | B2 | * | 7/2007 | Braun et al. ................. 358/1.9 |
| 2002/0140701 | A1 | | 10/2002 | Guyler |

OTHER PUBLICATIONS

Mahy, Marc, Calculation of Color Gamuts Based on the Neugebauer Model, Color Research and Application, Dec. 1997, 365-74, vol. 22, No. 6, John Wiley & Sons, Inc., New York.

Braun, et al, Image Lightness Rescaling Using Sigmoidal Contrast Enhancement Functions, Journal of Electronic Imaging, 8(4), Oct. 1999, pp. 380-393, The International Society for Optical Engineering, New York.

* cited by examiner

*Primary Examiner*—Gabriel I. Garcia
*Assistant Examiner*—Steven Kau
(74) *Attorney, Agent, or Firm*—Nelson Adrian Blish

(57) ABSTRACT

A method and system for constructing a color gamut allows the determination of the boundaries of the color gamut in color space for a color reproduction system having N-colorants. A forward model characterizing the color reproduction system is established and used to map a plurality of inkvectors from colorant space into color space. The color gamut is constructed by determining which of the mapped inkvectors define the boundaries of the color gamut in color space.

20 Claims, 7 Drawing Sheets

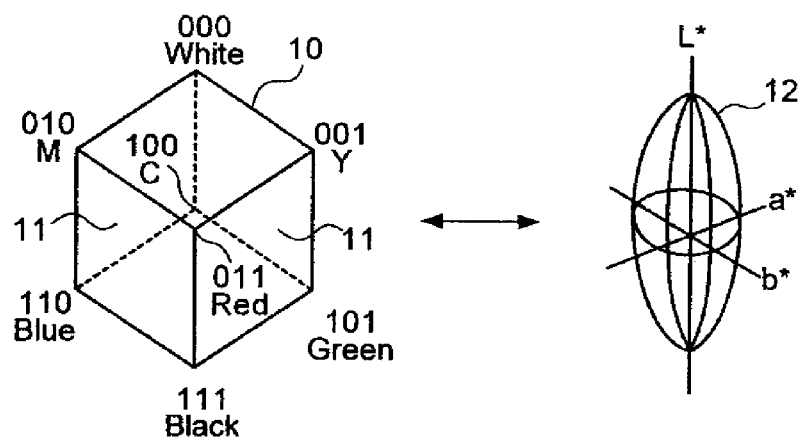
FIG. 1-A
FIG. 1-B
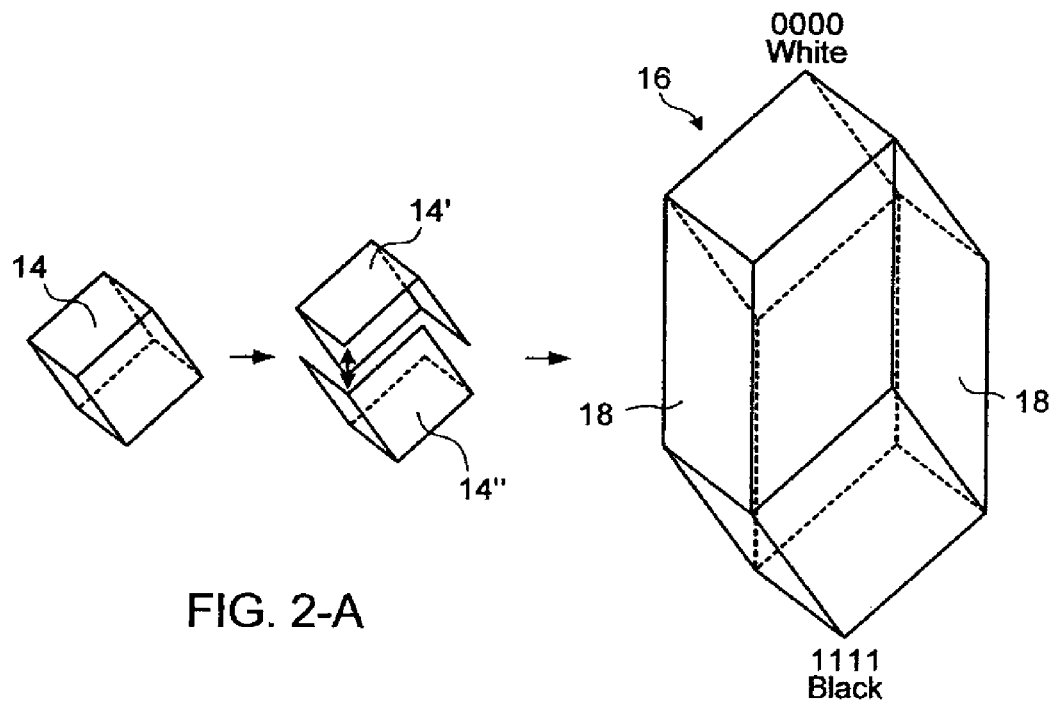
FIG. 2-A
FIG. 2-B

N-COLORANT GAMUT CONSTRUCTION

The invention relates to the field of color reproduction and more particularly to a method and apparatus for constructing a color gamut for a color expressing medium or device.

BACKGROUND OF THE INVENTION

The perception of color in human vision results from combinations of spectral distributions of light radiation being sensed by red, green and blue photoreceptors on the retina. The photoreceptors provide corresponding encoded signals, referred to as a color stimulus, to the brain which interprets the signals causing the perception of color. However, different spectral distributions can result in similar encoded signals, a phenomenon known as metamerism. Many color reproduction systems take advantage of the principle of metamerism to present spectral distributions to the retina that result in the perception of a particular desired color, even if the original spectral distribution was different to that in the reproduction.

In color science the encoded signals are referrred to as tristimulus values, being the amounts of the three primary colors that specify the color stimulus. The Commission Internationale de l'Eclairage (CIE) has standardized many aspects of color science and the 1931 CIE tristimulus values are called X, Y, and Z, respectively. The need for a uniform color space led to a number of non-linear transformations of the CIE 1931 XYZ space and finally resulted in the specification of one of these transformations as the CIE 1976 (L* a* b*) color space. The L* coordinate represents lightness and extends along an axis from 0 (black) to 100 (white). The other two coordinates a* and b* represent redness-greenness and yellowness-blueness respectively. Samples for which a*=b*=0 are achromatic and thus the L*-axis represents the achromatic scale of grays from black to white.

In color reproduction systems color images are generally reproduced using a combination of three or more color components such as Cyan, Magenta and Yellow (CMY) or Red, Green and Blue (RGB). For example, in color printing, Black (K) is also often added to the CMY set to improve rendering of dark tones (CMYK). Advances in digital imaging and computers have lead to a proliferation in the availability of digital images and corresponding advances in color printing have made possible the accurate representation of a real scene using a digital image.

Color management is a significant challenge, particularly in the printing industry wherein the need for precise rendering of color is well established and tools that assist a printer in achieving such precision have been available for some time. Color printing processes involve a range of different output devices including, but not limited to, offset lithographic, flexographic, and gravure printing presses, inkjet printers, xerographic printers, laser printers etc. In particular, matching a color proof sheet to the press sheet has always been a key objective, since the customer typically approves the color proof and will not accept a final print job that does not match the signed-off color proof.

It is well established that particular output devices have a color gamut determined by the colorants used to reproduce an image (e.g. inks on a printer). The color gamut demarcates that portion of color space in which a color expressing system can produce colors. The color gamut may be defined by a matrix of values defining the boundaries of the demarcated portion of color space.

In managing color it is very useful to know the limits or boundaries of the color gamut for a particular device. These limits are typically defined in color space by a gamut boundary descriptor (GBD). The GBD can be used to predict the range of achievable colors for a given set of colorants. Where the GBD indicates that colors in an original image are not achievable on an output device; steps may be taken to bring "out-of-gamut" colors "into gamut". Such steps may include a gamut mapping process that maps out-of-gamut colors to colors on or within the GBD. The particular gamut mapping process used may depend on the image type or viewing conditions and will typically involve repositioning out-of-gamut colors on or within the gamut boundary and may also involve applying tonal correction to colors that were on or inside the boundary to preserve overall tonal graduation.

A color gamut may be constructed by considering all possible interactions between the available colorants. Invariably, as the number of colorants is increased, the construction of a color gamut becomes much more complex and computationally inefficient due to the rapidly increasing number of possible interactions between colorants. Earlier color gamut construction techniques have often traded off speed for accuracy and vice-versa. Convex Hull based algorithms, such as that described in published U.S. patent application Ser. No. 2002/0140701A1 to Guyler, approximate the shape of the color gamut by operating on a set of points, which are derived from the measurement of color patches. It should be noted that in those parts of the color gamut where the boundary assumes a concave curvature, the convex hull description results in significant error.

Other techniques that employ more rigorous boundary detection algorithms are often quite slow. This results from the need to for matrix inversion operations on the forward model using such techniques as Newton-Raphson or simplex optimization to iteratively search for solutions. The forward model is a mathematical construct that relates ink combinations to color. In addition, these techniques are prone to converging on local minima, thereby creating inaccuracies.

U.S. Pat. No. 5,563,724 describes the characterization of a seven-ink printing process by decomposing the problem into six four-ink groupings. A separate subgamut is constructed from each of the six forward models. A super gamut is then constructed from the six subgamuts. A disadvantage of the process is that it is limited to inking each color with a maximum of four inks.

Accordingly there is a need for a system and method for constructing a color gamut boundary for a set of N-colorants, that mitigates some of the above disadvantages.

SUMMARY OF THE INVENTION

The invention provides a system and method for constructing a color gamut for a N-colorant color reproduction system by using a forward model to map a set of inkvectors in colorant space to color space. A subset of the mapped inkvectors define the color gamut boundaries in color space.

One aspect of the present invention provides a method for constructing a color gamut for a plurality of colorants used in a color image reproduction system. A forward model is established for the color image reproduction system. The forward model characterizes the correspondence between combinations of the plurality of colorants and resulting colors in color space. A set of inkvectors defining combinations of colorants in colorant space are then generated and mapped into color space using the forward model. A subset of the mapped set of inkvectors which define boundaries of the color gamut are selected.

The method has the advantage of being computationally efficient as it does not require complex inversion machinery and makes no physically based assumptions regarding the interaction between the colorants. Furthermore, no assumptions need be made regarding the physical interaction of the inks and the method results in an accurate gamut depiction applicable to any N-colorant color expressing system or device.

BRIEF DESCRIPTION OF THE DRAWINGS

Embodiments of the present invention will now be described by way of example only with reference to the following drawings in which:

FIG. 1-A is perspective view of a CMY color cube;

FIG. 1-B is a perspective view of a CMY color gamut;

FIG. 2-A and FIG. 2-B are perspective views showing the development of a CMY color cube into a CMYK color cube;

FIG. 5-B is a graphical depiction of a inkvector path in color space at $L^*=70$;

FIG. 6-B is a graphical depiction of the endpoints of a set of inkvectors for a CMYK colorant set with corresponding endpoints joined;

FIG. 6-C is a graphical depiction of the endpoints of a set of inkvectors for a 6-colorant set with corresponding endpoints joined;

DETAILED DESCRIPTION OF THE PREFERRED EMBODIMENTS

Figure 3:
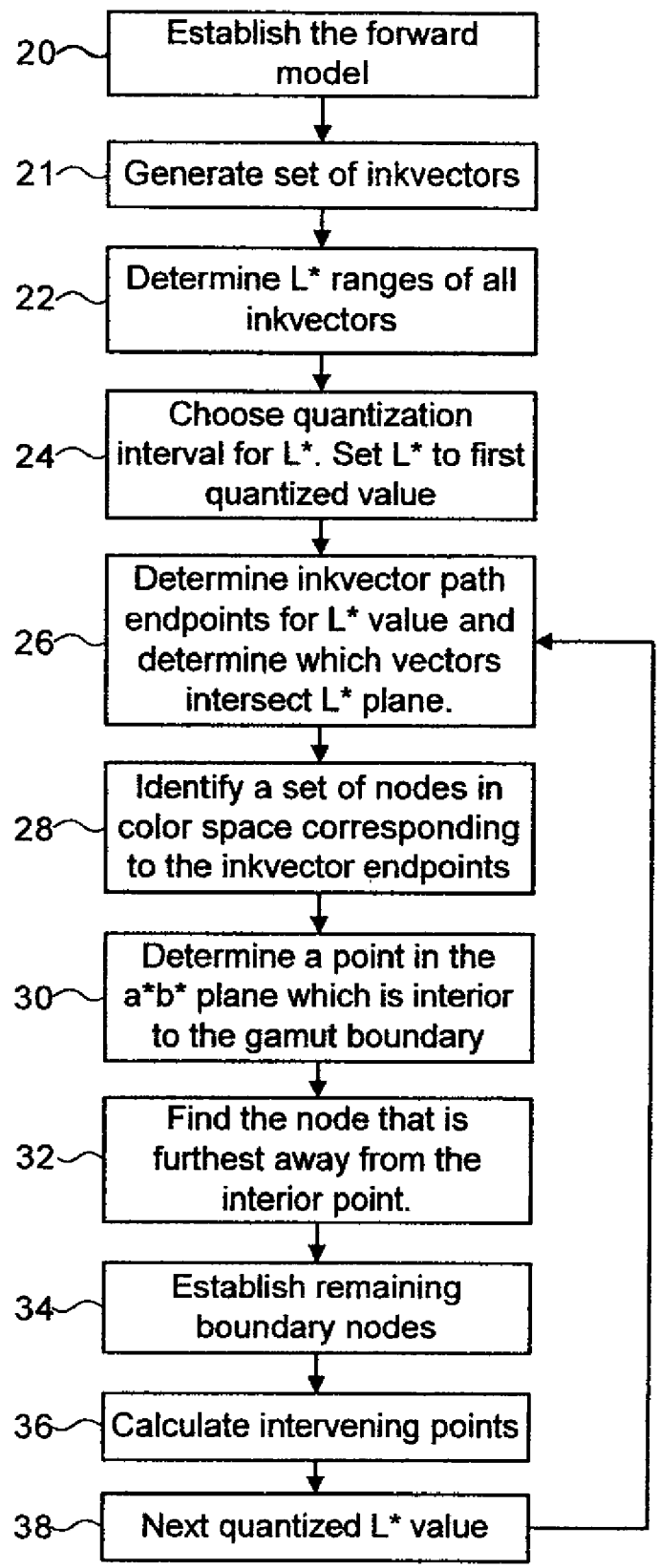
FIG. 3 is a process flow diagram in accordance with an embodiment of the present invention.

For an understanding of the invention, reference will now be made by way of example to a following detailed description in conjunction with the accompanying drawings in which like numerals refer to like structures.

FIG. 1 shows a color cube 10 for a 3-ink CMY hardcopy rendering inkset. Each of the inks is represented on one of an orthogonal set of axes, termed a colorant space. The outer surfaces of the cube represent planes 11 along which two of the inks are allowed to vary in density while the third is fixed at a maximum or minimum density value. The cube 10 is represented in colorant space and defines the physically achievable ink or colorant values for the CMY inkset. A plane 11 in colorant space may be described by an inkvector. The inkvector designates which two inks are free to vary and which inks are set at their maximum or minimum values. Table 1 shows a set of six inkvectors for the 3-colorant CMY example in FIG. 1. The "X's" denote inks that are free to vary while the "0's" and "1's" denote inks held at minimum or maximum, respectively.

Each inkvector in Table 1 thus corresponds to a particular surface plane 11 of the cube 10 in FIG. 1-A. In general a set of such inkvectors, corresponding to the planes in a particular colorant space and combinatorially following the above definition, constitutes a complete set of inkvectors for a given N-ink system where N is an integer. For an output device such as a printing press, in most cases N will range between 3 and 7, although printing is not limited to a maximum of seven colorants.

TABLE 1

| Inkvector Set | | |
|---|---|---|
| C | M | Y |
| X | X | 0 |
| X | 0 | X |
| 0 | X | X |
| X | X | 1 |
| X | 1 | X |
| 1 | X | X |

FIG. 1-B shows the mapping of CMY colorant space to a color gamut 12 in CIE L*a*b color space. One aspect of the 3-ink cube 10 that simplifies the gamut constriction in color space is that all points on the surface planes 11 map directly to the surface of the color gamut 12. Determining the set of inkvectors that exclusively map to the surface of the color gamut and completely define it can aid in the construction in color space. Since all the inkvector combinations for a CMY inkset correspond to exterior planes of the color cube 10, the mapping of these inkvectors via the forward model into color space defines the color gamut in color space.

The addition of black ink (K) to a CMY system creates a 4-ink system (CMYK). Conceptually the addition of black ink may be though of as transforming the CMY cube into a 12-sided dodecahedron. Referring to FIG. 2-A, this transformation of the CMY cube 14 can be viewed as the extrusion of the top three planes 14' from the bottom three planes 14'', forming a dodecahedron 16 shown in FIG. 2-B. Six parallelograms 18 form the midsection of dodecahedron 16 and K varies along the vertical lines of the parallelograms. Note that dodecahedron 16 is a colorant space construct—the construction of the color gamut in color space follows. As is the case for the cube 10 in a CMY system, all inkings on the surface planes of dodecahedron 16 map on to the surface of the color gamut (not shown) and completely define it. Rigorously speaking a 4-ink system combinatorially contains a total of 24 inkvectors, as listed in Table 2.

TABLE 2

| | Surface inkvectors | | | | Interior inkvectors | | | |
|---|---|---|---|---|---|---|---|---|
| | C | M | Y | K | C | M | Y | K |
| 3 Top planes of CMY Cube (K = 0) | X | X | 0 | 0 | X | X | 1 | 0 |
| | X | 0 | X | 0 | X | 1 | X | 0 |
| | 0 | X | X | 0 | 1 | X | X | 0 |
| Intermediate faces of dodecahedron- K and 1 chromatic ink varies | 0 | 1 | X | X | X | X | 0 | 1 |
| | 1 | 0 | X | X | X | 0 | X | 1 |
| | 0 | X | 1 | X | 0 | X | X | 1 |
| | 1 | X | 0 | X | 0 | 0 | X | X |
| | X | 1 | 0 | X | 1 | 1 | X | X |
| | X | 0 | 1 | X | 0 | X | 0 | X |
| 3 Bottom planes of CMY extruded by K | X | X | 1 | 1 | 1 | X | 1 | X |
| | X | 1 | X | 1 | X | 0 | 0 | X |
| | 1 | X | X | 1 | X | 1 | 1 | X |

For CMYK inks only half of the inkvectors map directly to the surface of the color gamut. The remaining inkvectors specify colors that map to points inside the color gamut volume. Clearly when constructing the color gamut boundary it is necessary to determine which inkvectors map to the boundary and which inkvectors map to the interior of the color gamut. For the specific example of a CMYK inkset one can make an assumption that the black ink has a physical interaction with the other inks that uniformly darkens these colors. Using this assumption the subset of twelve inkvectors that map to the surface of the gamut and completely define may be identified.

In this case, the identification of the subset of twelve inkvectors comprising the dodecahedron 16 is possible because of the specific nature of the assumed interaction of black ink with the other three chromatic inks. However, in general, when N>3 and the added ink or colorant is chromatic in nature, there is no general way of unambiguously determining a subset of inkvectors which completely define and only map to the surface of the gamut in color space. Additional chromatic inks have complex interactions with other inks especially in darker tonal regions, which consequently are not easily modeled using physical considerations. CMYK is thus a special case of an N>3 colorant set, in that black ink interacts with all inks in a consistent manner at all tonal levels—i.e. it darkens all colors.

By constructing a table of all combinations it can be seen that the number of inkvectors increases geometrically as N increases. Table 3 lists the number of inkvectors for a number of different N-colorant systems.

TABLE 3

| N | Number of Inkvectors |
|---|---|
| 3 | 6 |
| 4 | 24 |
| 5 | 80 |
| 6 | 240 |
| 7 | 672 |

A robust N-colorant gamut construction algorithm should work for any combination of N-colorants including N chromatic inks or colorants without the need to make assumptions about the physical interaction of inks as was done in analyzing the CMYK situation.

FIG. 3 shows a process flowchart for constructing the N-colorant gamut, according to an embodiment of the invention. At a first step 20 the system is characterized by establishing a forward model, relating colorant to color. For the case where colorants are inks, the forward model may be obtained by printing test patches of various ink combinations covering the range of device control values. The CIELAB color values for each of the test patches may then be measured using a color measuring device such as a spectrophotometer or colorimeter. Finally, the CIELAB color values are fitted utilizing a suitable basis function to create the forward model which relates colorants to resulting color. The basis function may be a high order polynomial. All combinations of colorants, when inputted into the forward model, sweep out a volume in color space that represents the color gamut of the device or medium although it does not directly enable the identification of the color gamut boundaries.

At step 21 a combinatorially complete set of inkvectors for a given N-colorant system is generated. Since each inkvector defines a planar surface in the colorant space, the complete set of ink inkvectors can be obtained by identifying all combinations of two free inks with other inks held at all combinations of maximum or minimum ink Next at step 22, the tonal range (L* range) of each inkvector in the set is determined. For each inkvector the freely varying colorants are alternately set to their maximum and minimum values and then evaluated through the forward model to obtain the tonal range. The tonal range of the 24 inkvectors for a 4-ink CMYK system is plotted in the graph shown on FIG. 4-A, and for a 6-ink system in FIG. 4-B. Note that more inkvectors bracket L* values in the shadows (low L* value) than in the lighter tonal regions (high L* value) since the perceptual darkening diminishes incrementally as one adds ink to increasing amounts of ink already on paper.

At step 24 a convenient quantization interval is selected for the L* axis. This choice may be made a priori, based on the maximum and minimum L* values characteristic for the process. From this point, a plane by plane construction of the gamut may commence, each plane of constant lightness corresponding to a specific L* quantization level. It is not necessary to choose any particular L* as a first value but conventionally one would start at the lowest or highest L* and work toward the opposite end of the range.

Figure 4A:
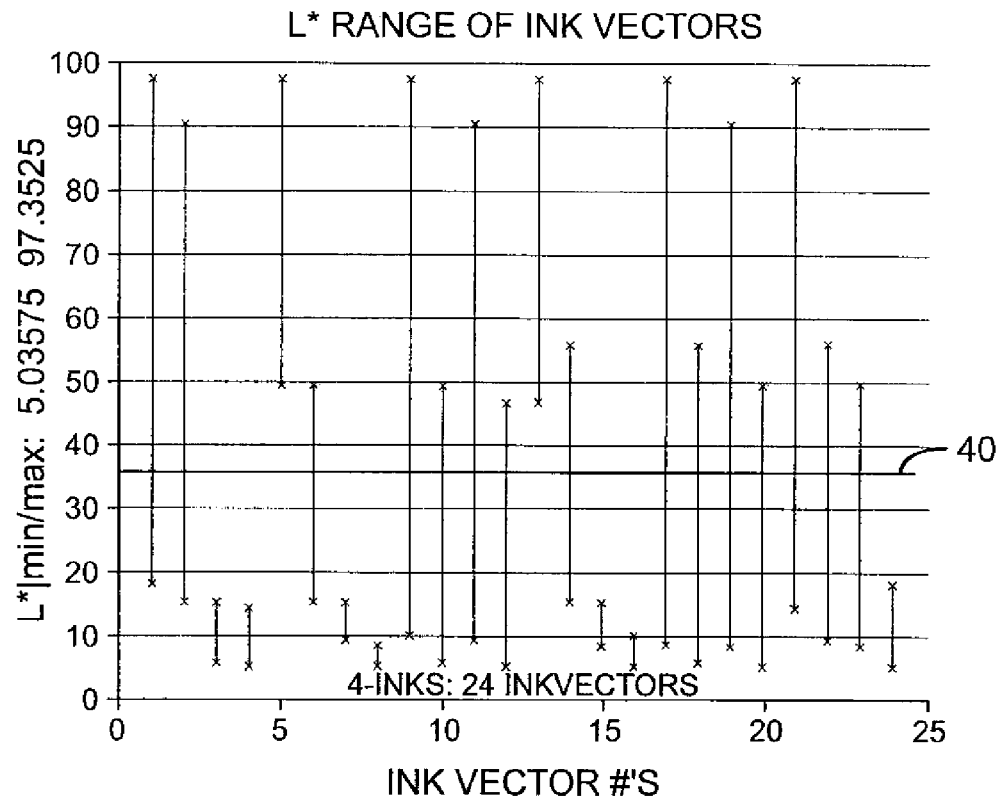
FIGS. 4-A and 4-B are graphical depictions of the L* range for a 4-colorant and a 6-colorant set respectively.
Figure 4B:
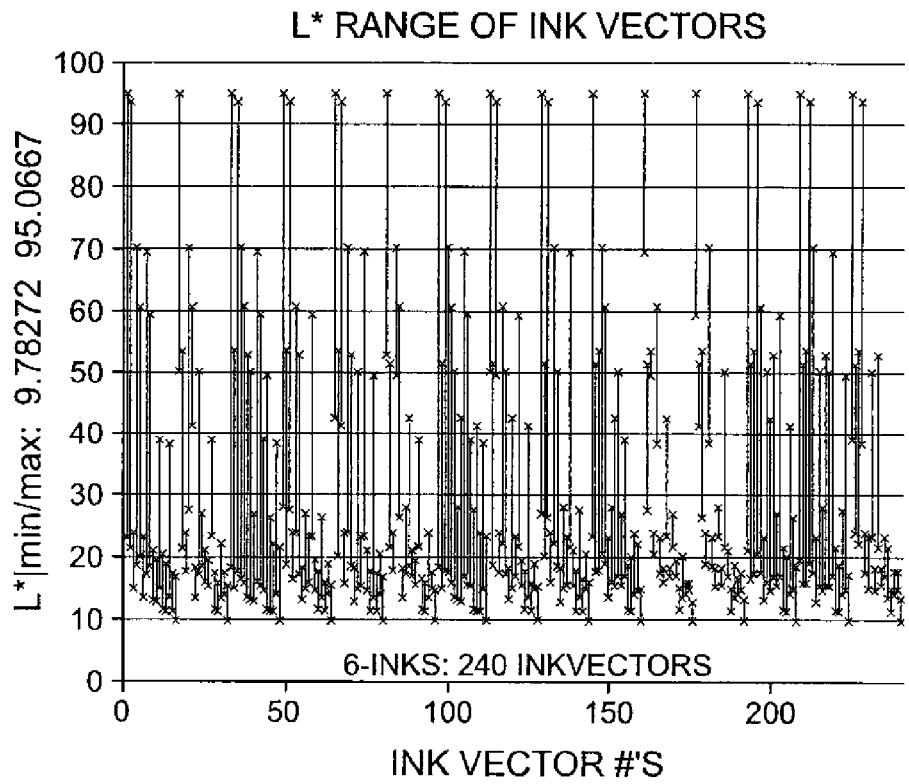

At step 26 the number of inkvectors that intersect a particular L* plane is determined. FIG. 4-A shows that for a 4-colorant CMYK system, 15 inkvectors out of 24 intersect the plane 40 at L*=35. If an inkvector intersects an L* plane, it implies that there exists some range of values of its free inks which generate a limited set of points in color space whose L* values are that of the selected L* plane. Otherwise put, since a inkvector defines a plane, the intersection of this plane with plane 40 will be a line having two endpoints.

Figure 5A:
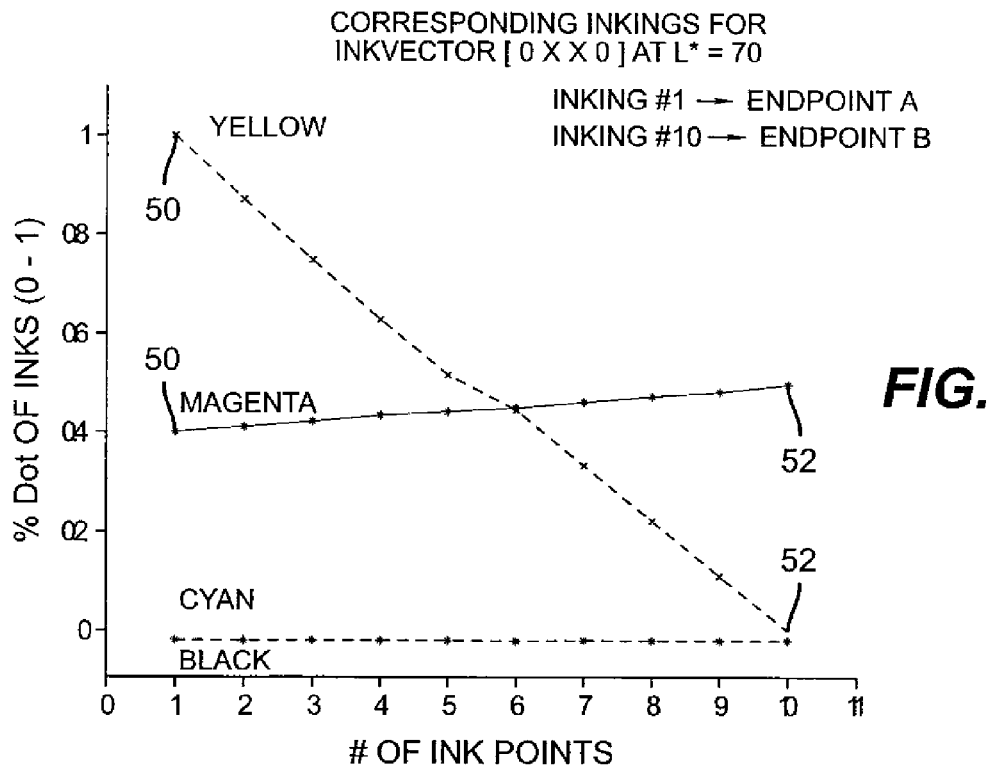
FIG. 5-A is a graphical depiction of the colorant values of an CMYK inkvector at $L^*=70$.
Figure 5B:
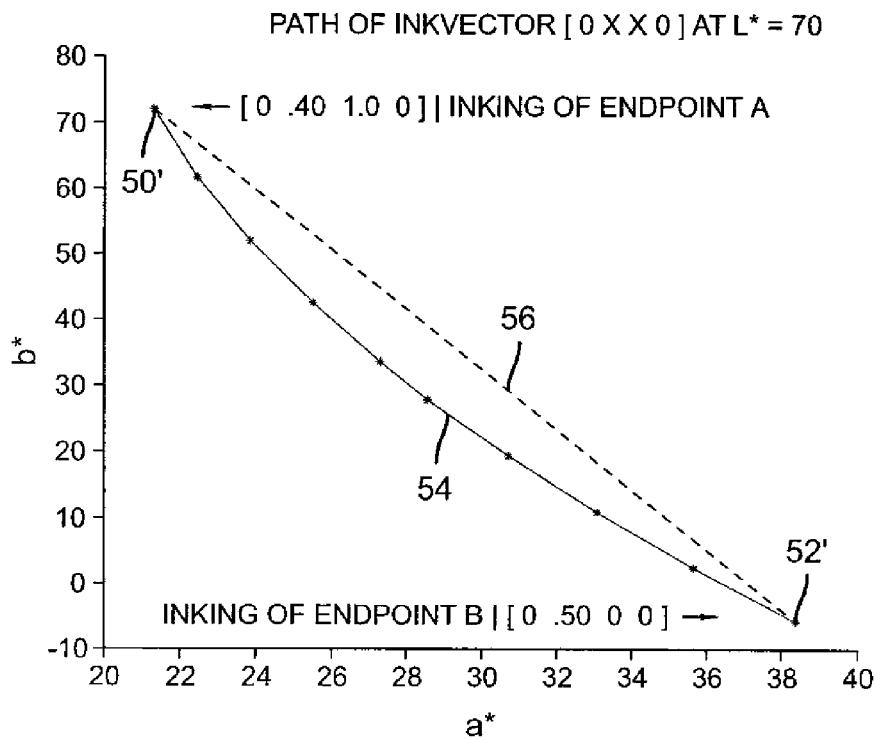

Clearly for the L* value to remain constant the two free inks must vary in inverse proportion i.e. as the tone of one increases the tone of the other decreases. FIG. 5-A graphically depicts a inkvector path on the L*=70 plane for a typical CMYK system. The inkvector plotted is [0 X X 0], which indicates that M & Y vary while C & K are fixed at their minimum (0 in this case). As the ink plot in FIG. 5-A shows, the free inks vary inversely to one another in order to achieve colors of constant L*. At each endpoint of the path, one of the varying inks is at its relative minimum and the other ink is at its relative maximum and for each abscissa the inking yields a L* value of 70. The end points are indicated as 50 and 52. For each inkvector that intersects a particular L* plane, the endpoints of the inkvector path may be computed in the a*b* plane via the forward model. In FIG. 5-B the endpoints 50' and 52', corresponding to endpoints 50 and 52 in FIG. 5-A are plotted on the a*b* plane in color space. Endpoints 50' and 52' are the terminus points for a path 54 that each inkvector traces out at constant L* in the a*b* plane. Note that the path 54 between endpoints 50' and 52' in the a*b* plane of L*a*b* color space is generally not a straight line 56 since in color space the physical interaction of the inks is often non-linear.

Figure 6A:
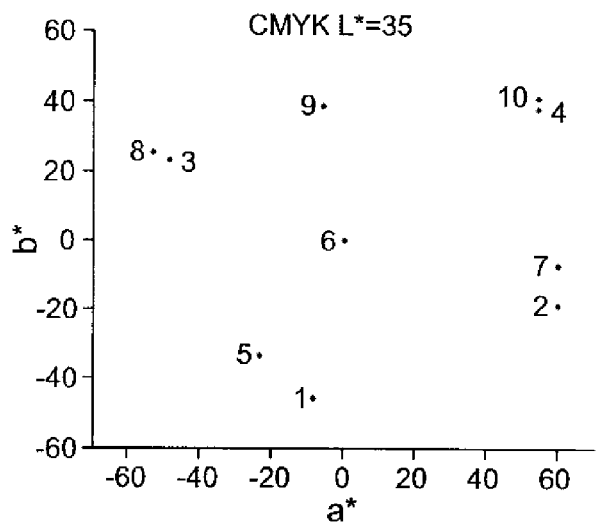
FIG. 6-A is a graphical depiction of the endpoints of a set of inkvectors for a CMYK colorant set.
Figure 6B:
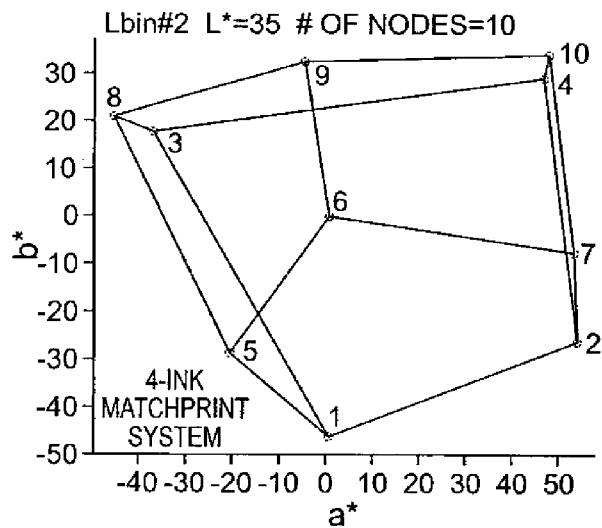
Figure 6C:
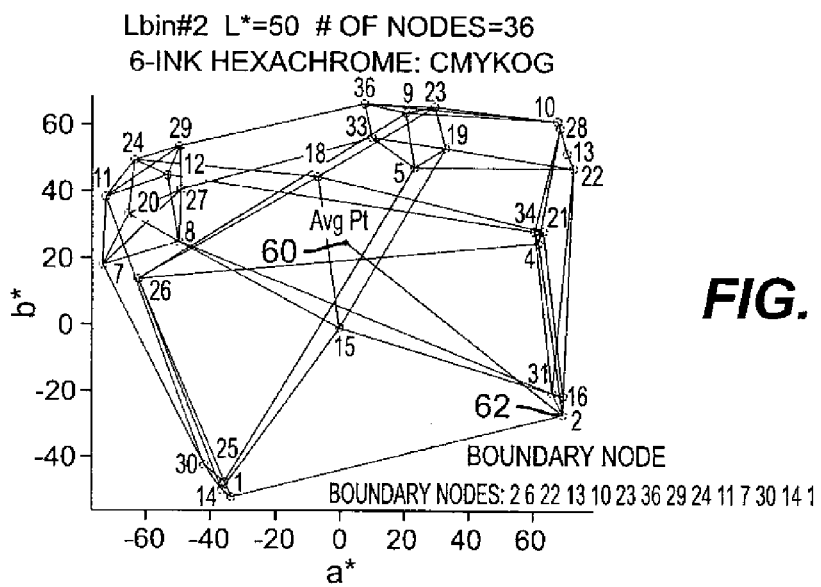

In the FIG. 4-A CMYK example, 15 inkvectors out of the complete set of 24 intersect the L*=35 plane, which one would expect to yield 30 endpoints. However, in plotting these endpoints the a*b* plane as shown in FIG. 6-A only 10 unique points appear. If instead of plotting the points individually, paired endpoints are connected by a solid line as depicted in FIG. 6-B, it is immediately apparent there are only 10 unique endpoints for the CMYK colorant set and that each point has 3 lines originating therefrom. These points will be referred to as nodes. These nodes are identified in step 28.

For the CMYK case each node has 3 lines emanating from it connecting it to neighboring nodes. In general, a given node in an N-colorant system will have N-1 connections to other nodes. The N-1 connections each node makes with its surrounding nodal neighbors reflect the interactions of an ink with the other N-1 inks in forming paths of constant L* in color space. FIG. 6-C shows a similar plot to that shown in FIG. 6-B for a set of six colorants. Note that each node now has 5 lines emanating from it. The rough outline of the gamut boundary is already discernable in FIGS. 6-B and 6-C (in this case for an L* value of 50). The nodes may be grouped into 2 categories: those that form the exterior skeleton of the gamut and those that are interior to it.

Once all the nodes have been identified, the subset of nodes that lie on the boundary of the gamut are then identified. The inter-connectivity of these nodes simplifies this task. In step 30 in FIG. 3, a point is determined in the a*b* plane which is interior to the gamut boundary. An interior point can be obtained by averaging all nodes, which must intuitively be an interior point.

Referring now to FIG. 6-C, having established an interior point 60, the first identification of a node that lies on the gamut boundary may take place. The distance between each node and the average point is computed. It is presumed that the node which lies furthest from the average point must be in the subset of nodes which define the gamut boundary. This furthest node is identified in step 32 in FIG. 3 and shown at reference numeral 62 in FIG. 6-C.

Figure 7:
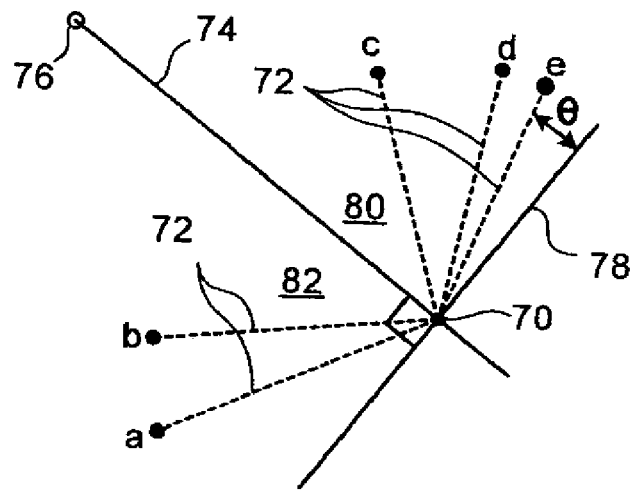
FIG. 7 is a schematic view of a boundary node.

Once the first boundary node 62 has been identified, the remaining boundary nodes and their connectivities may be established in step 34. FIG. 7 shows how successive boundary nodes are identified for the example of 6-ink system. Each node 70 has 5 connecting lines 72 to neighboring nodes a, b, c, d and e. A line 74 is drawn connecting an interior point 76 to node 70 (interior point 76 may be the average point but this is not mandated). Another line 78 is drawn perpendicular to line 74. The search for the next connected node occurs in a counter-clockwise direction and only those connected nodes that lie in the 1st & 4th quadrants (80 and 82) are examined. The quadrants 80 and 82 are defined by the mutually perpendicular lines 74 and 78. Therefore, only nodes c, d and e will be considered. The angle between perpendicular line 78 and each connecting line 72 (corresponding to points c, d and e) is computed. The connection to node "e" in this case exhibits the minimum angle θ with respect to perpendicular line 78 and thus node "e" is selected as being a boundary node.

This process is repeated for each successively identified node until the starting node 70 is again encountered, at which point the gamut boundary has been completely defined. For robustness, the same identification procedure may be performed in a clockwise direction to verify the integrity of the set of gamut boundary nodes. Should they not agree, then an error condition exists and other remedial action must be taken.

Figure 8:
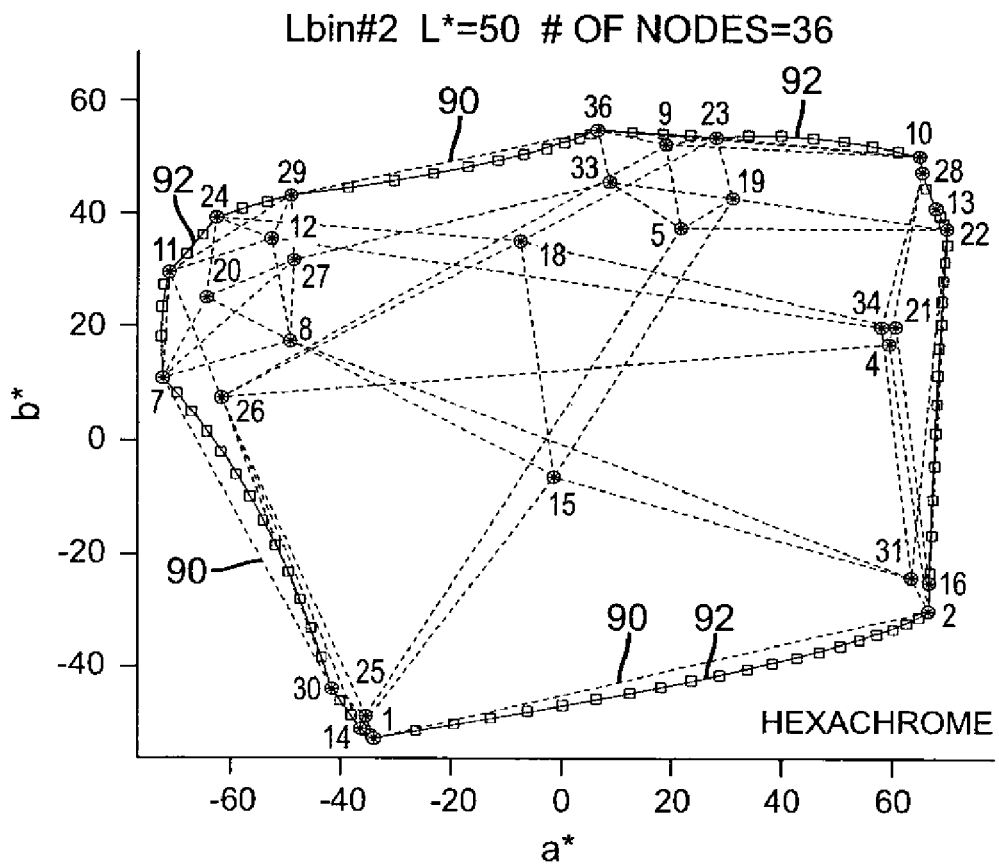
FIG. 8 is a graphical depiction of a gamut boundary for a 6-colorant system at $L^*=50$.

At this point in the process the skeletal outline of the gamut boundary can be viewed when the set of boundary nodes is plotted and connected via straight lines 90 as shown in FIG. 8. Each successive pair of nodes represent inkvector path endpoints as described earlier. Equivalently, each nodal pair maps to a unique inkvector. Note however that the actual boundary is not necessarily described by straight lines 90 since up to now we have been only using inkvector endpoints. The full path is computed in step 36 with as many intervening points as deemed necessary by the user. This calculation is aided by the fact that one knows the initial and final values for each of the two freely varying inks. The searches are one-dimensional in character and accurate seeds are obtained using linear approximations. Convergence usually occurs within 2 to 4 evaluations of the forward model. The resulting boundary 92 defines the color gamut for a specific L* value.

To complete the gamut, the next L* is selected in step 38 and steps 26 to 38 are repeated until a full color gamut is constructed.

Advantageously the methods of the present invention are completely general in nature and make no implicit assumptions regarding either the behavior of an individual ink or the overall interaction among inks. It is computationally light-weight in scope since no computationally expensive inversion machinery is employed. The gamut is rendered quite accurately in that the major structural features are identified and extracted. It is only afterwards that the intervening points are computed to whatever density level the user deems necessary.

Figure 9:
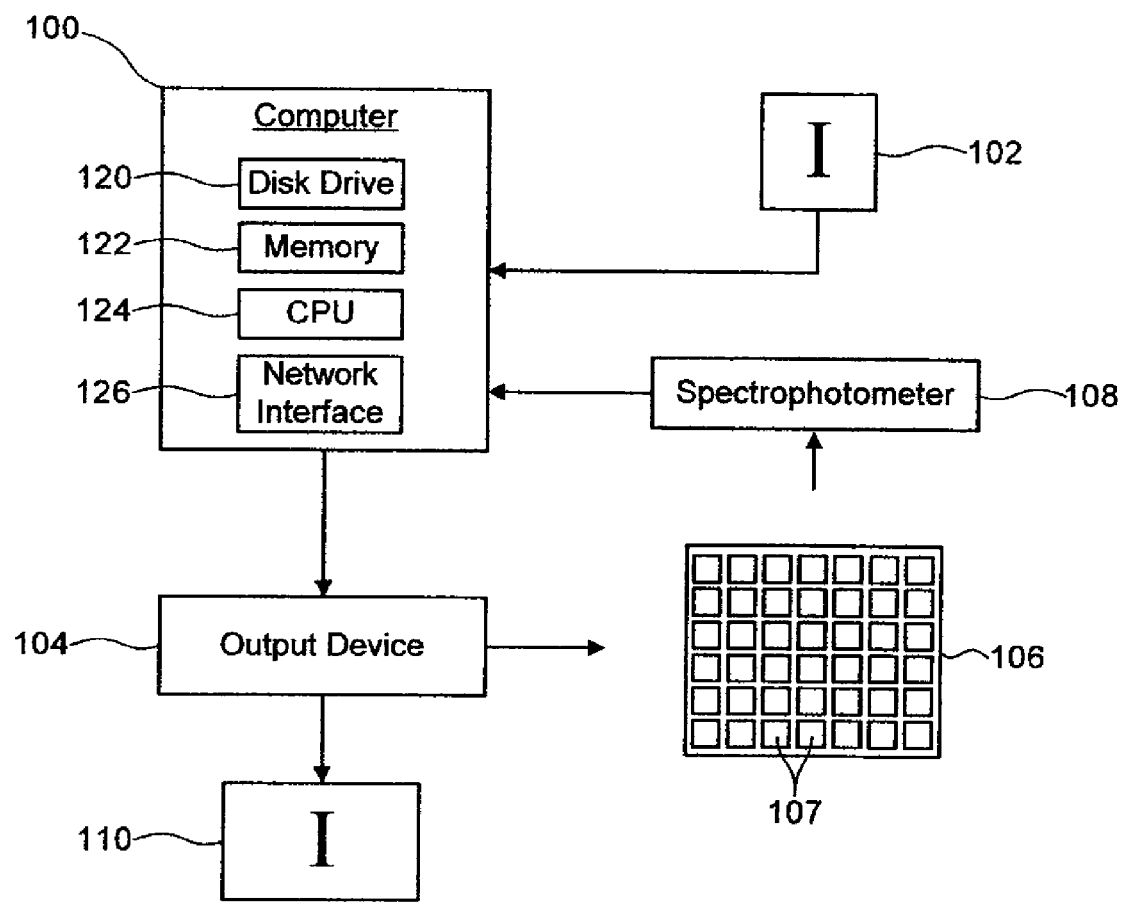
FIG. 9 is schematic view of an embodiment of the present invention.

In the foregoing description the usage of the term "ink" obviously applies to hardcopy rendition of color images using ink colorants. However the present invention is not limited to constructing a color gamut for ink colorants, but may be used in the context of any medium on which color can be visually expressed. This includes, but is not limited to, devices where the colorants are associated with the medium itself and the medium reacts in response to some stimulus to express color. The term "inkvector" should thus also be understood to encompass cases where the colorant is not an ink Those of skill in the art will realize that the invention may be conveniently embodied in a system such as that shown in FIG. 9. A computer 100 is able to receive a color image representation 102 and to output the image to output device 104. Computer 100 is also programmed with the functionality to cause output device 104 to print test sheet 106 having a plurality of test patches 107. Each test patch 107 represents a particular combination of colorants. A color measuring device such as a spectrophotometer 108 is coupled to the computer. The spectrophotometer is used to quantify the color values on test patches 107 and input these to the computer 100. The coupling between spectrophotometer 108 and computer 100 may be a direct interface, an indirect data transfer such as a computer readable medium or even a keyboard for manual input by an operator. Once the output device has been characterized in accordance with the invention, the system my be used to make image reproductions 110 of image 102 on output device 104.

Computer 100 has a memory 122 and typical storage devices such as a disk unit 120 (Hard drive and/or a CD ROM drive), allowing the invention to be implemented as a programmed product or downloaded from a network connection 126 into the memory 122. The image 102 is received from a input device such as a scanner or digital camera (not shown) or it may be received as data encoded on a removable storage device such as a CD ROM. Color image representation 102 may be in any of a large variety of graphic image representation formats such as jpeg, png, tiff or any other format.

As will be apparent to those skilled in the art in light of the foregoing disclosure, many alterations and modifications are possible in the practice of this invention without departing from the spirit or scope thereof.

What is claimed is:

1. A method for constructing a color gamut for a plurality of colorants used in a color image reproduction system, comprising the steps of:

establishing a forward model for the color image reproduction system, the forward model characterizing the correspondence between combinations of the plurality of colorants and resulting colors in a color space;

generating a set of inkvectors defining combinations of colorants in colorant space wherein each inkvector comprises two colorants that are allowed to vary freely between their respective minimum and maximum values, the remaining colorants being fixed at one of a maximum or a minimum value;

using the forward model for mapping an inkvector coordinate into a color space coordinate;

generating a plurality of gamut contours for a plurality of lightness levels in the color space wherein generating a gamut contour for a lightness level comprises:

identifying a subset of inkvectors for the lightness level wherein the lightness range for each inkvector of the subset includes the lightness level;

identifying a pair of endpoint coordinates in the color space for each inkvector of the subset of inkvectors for the lightness level wherein the pair of endpoint coordinates for an inkvector correspond to endpoints of a line formed by the intersection of the inkvector plane mapped to the color space and a lightness plane of the color space corresponding to the lightness level;

identifying boundary coordinates from amongst the endpoint coordinates for the subset of the inkvectors; and forming the gamut contour for the lightness level by connecting the boundary coordinates.

2. A method according to claim 1, comprising a further step of identifying at least one color in a color image to be reproduced that is outside the boundaries of the color gamut.

3. A method according to claim 2, comprising mapping the at least one identified color to produce a color that is on or inside the boundaries of the color gamut.

4. A method according to claim 3, comprising a further step of reproducing the color image on the color image reproduction system.

5. A method according to claim 1, wherein establishing the forward model comprises:
generating a plurality of test patches on a medium, each test patch corresponding to a specific combination of colorants;
measuring a color value for each of the test patches; and
fitting the color values to a suitable basis function.

6. A method according to claim 5, wherein the color value is measured using a spectrophotometer.

7. A method according to claim 6, wherein the color value is measured in CIELAB color space.

8. A method according to claim 1, wherein the colorants comprise printing inks.

9. A method according to claim 1, wherein the colorants comprise xerographic toners.

10. A method according to claim 1, wherein the set of inkvectors comprise all possible combinations of the plurality of colorants.

11. A method according to claim 1, wherein the boundaries of the color gamut are constructed for each of a plurality of planes of constant lightness in said color space.

12. A method according to claim 11, wherein a plurality of boundary nodes are identified for each plane of constant lightness, the method further comprising the step of determining a plurality of intervening points between adjacent pairs of the plurality of boundary nodes.

13. A method according to claim 1, wherein the plurality of colorants comprise at least three colorants.

14. A method according to claim 1, wherein the plurality of colorants comprise less than eight colorants.

15. A general purpose computer processor configured to perform the method of claim 1.

16. A computer program product for constructing a color gamut for a plurality of colorants used in a color image reproduction system, the computer program product comprising a computer readable storage medium having a computer program stored thereon for performing the steps of:
establishing a forward model for the color image reproduction system, the forward model characterizing the correspondence between combinations of the plurality of colorants and resulting colors in color space;
generating a set of inkvectors defining combinations of colorants in colorant space wherein each inkvector comprises two colorants that are allowed to vary freely between their respective minimum and maximum values, the remaining colorants being fixed at one of a maximum or a minimum value;
using the forward model for mapping an inkvector coordinate into a color space coordinate;
generating a plurality of gamut contours for a plurality of lightness levels in the color space wherein generating a gamut contour for a lightness level comprises:
identifying a subset of inkvectors for the lightness level wherein the lightness range for each inkvector of the subset includes the lightness level;
identifying a pair of endpoint coordinates in the color space for each inkvector of the subset of inkvectors for the lightness level wherein the pair of endpoint coordinates for an inkvector correspond to endpoints of a line formed by the intersection of the inkvector plane mapped to the color space and a lightness plane of the color space corresponding to the lightness level;
identifying boundary coordinates from amongst the endpoint coordinates for the subset of the inkvectors; and
forming the gamut contour for the lightness level by connecting the boundary coordinates.

17. A method according to claim 1 wherein establishing the lightness range for an inkvector comprises:
identifying a pair of inkvector coordinates wherein each coordinate includes a maximum value for one freely varying colorant and a minimum value for the other freely varying colorant;
mapping the pair of inkvector coordinates to said color space; and
determining the lightness range based on the lightness values of the mapped pair of inkvector coordinates.

18. A method according to claim 1 wherein identifying the pair of endpoint coordinates in the color space for an inkvector of the subset of inkvectors for the lightness level comprises:
identifying a plurality of inkvector coordinates wherein each mapped inkvector coordinate comprises a lightness value corresponding to the lightness level; and
selecting the pair of endpoints from the plurality of inkvector coordinates wherein the value of one freely varying colorant is a relative maximum and wherein the value of the other freely varying color is a relative minimum.

19. A method according to claim 1 wherein identifying boundary coordinates from amongst the endpoint coordinates for the subset of the inkvectors comprises:
identifying an interior coordinate based on the endpoint coordinates;
identifying a first boundary coordinate as the coordinate furthest from the interior coordinate; and
identifying other boundary coordinates based on the geometrical relationship between the first boundary coordinate, an interior coordinate and the endpoint coordinates for the subset of inkvectors.

20. A method according to claim 4 wherein identifying other boundary coordinates based on the geometrical relationship between the first boundary coordinate, an interior coordinate and the endpoint coordinates for the subset of inkvectors comprises:
(a) selecting the first boundary coordinate as the reference coordinate;

(b) identifying a coordinate system comprising a first line connecting the reference coordinate and the interior coordinate as the y-axis and a second line perpendicular to first line and intersecting the reference coordinate as the x-axis;

(c) identifying at least one candidate line wherein a candidate line connects the reference coordinate and an endpoint coordinate located in either the first or fourth quadrants of the coordinate system;

(d) selecting a next boundary coordinate from the at least one candidate line having the smallest counterclockwise angular displacement from the x-axis; and (e) repeating steps (b) to (d) with the next boundary coordinate selected as the reference coordinate until selecting the next boundary coordinate selects the first boundary coordinate.

* * * * *